United States Patent
Macleod et al.

(10) Patent No.: US 7,119,984 B2
(45) Date of Patent: Oct. 10, 2006

(54) METHOD AND APPARATUS FOR A LASER-WELDED DISK DRIVE HOUSING

(75) Inventors: Donald James Macleod, Santa Cruz, CA (US); James Sidney Lee, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 251 days.

(21) Appl. No.: 10/263,177

(22) Filed: Oct. 1, 2002

(65) Prior Publication Data

US 2003/0223148 A1 Dec. 4, 2003

Related U.S. Application Data

(60) Provisional application No. 60/385,522, filed on Jun. 3, 2002.

(51) Int. Cl.
G11B 33/14 (2006.01)

(52) U.S. Cl. .................. 360/97.01; 360/97.02

(58) Field of Classification Search ............. 360/97.01, 360/97.02
See application file for complete search history.

(56) References Cited

U.S. PATENT DOCUMENTS

| 4,162,390 A | 7/1979 | Kelly |
| 4,686,592 A * | 8/1987 | Carroll et al. ........... 360/78.08 |
| 5,422,766 A * | 6/1995 | Hack et al. .............. 360/97.02 |
| 5,454,157 A | 10/1995 | Ananth et al. |
| 5,519,184 A | 5/1996 | Umlas |
| 5,608,592 A * | 3/1997 | Mizoshita et al. ....... 360/256.2 |
| 5,861,602 A * | 1/1999 | Cox et al. .............. 219/121.64 |
| 5,997,463 A | 12/1999 | Cutrer |
| 6,392,838 B1 | 5/2002 | Hearn et al. |
| 6,694,617 B1 * | 2/2004 | Gredinberg et al. ..... 29/898.02 |
| 6,762,909 B1 * | 7/2004 | Albrecht et al. ......... 360/97.02 |

FOREIGN PATENT DOCUMENTS

| DE | 39 02 163 A | 6/1990 |
| EP | 0 546 680 A | 6/1993 |
| JP | 08 161881 A | 10/1996 |

OTHER PUBLICATIONS

International Search Report mailed Sep. 18, 2003, for PCT patent application No. PCT/US03/17634, filed Jun. 3, 2003: 3 pages.

* cited by examiner

Primary Examiner—A. J. Heinz
(74) Attorney, Agent, or Firm—Morrison & Foerster LLP

(57) ABSTRACT

The present invention provides methods for laser sealing of disk drive housings. In addition, laser sealed housings are provided. Laser sealing of hard drives, allows for the disk drive assembly to be maintained in an inert gas environment.

20 Claims, 4 Drawing Sheets

METHOD AND APPARATUS FOR A LASER-WELDED DISK DRIVE HOUSING

CROSS-REFERENCE TO RELATED APPLICATIONS

This application claims priority to U.S. Provisional Application Ser. No. 60/385,522, filed Jun. 3, 2002; entitled, "Laser-based Metal Sealing Of Disk Drives". The foregoing patent application, which is assigned to the assignee of the present application, is incorporated herein by reference in its entirety.

BACKGROUND OF THE INVENTION

In the highly competitive disk drive industry, manufacturers continually strive for improved performance along several fronts. Perhaps best known are the ongoing efforts to increase data storage capacity within given size limits by increasing the density at which bit-encoded data may be stored. Closely related, are the attempts to arrange the disk drive components to more effectively utilize available space, either to reduce the size of the drive, or to provide a drive of the same size with increased storage area, improved operating efficiency, or both. Moreover, there is effort to continuously improve drive performance and life.

Typically a disk drive will include a rigid and stationary housing, at least one storage disk, and a means for supporting the data storage disk inside the housing for rotation about a spindle axis relative to the housing. A drive typically further includes a transducing head for writing bit-encoded data onto the recording surface of the disk, and for reading bit-encoded data previously stored on the recording surface. An actuator means is provided inside the housing for controllably positioning the transducing head relative to the recording surface. Controlling electrical circuitry controls the rotation of the disk, the positioning of the transducing head and the writing and reading of the bit-encoded data. The control circuitry includes a circuitry layer, several electrical circuit panels, and means for bonding the electrical circuit plant panels to the circuitry layer to position the circuit panels apart from one another. A mounting means secures the circuit panels integrally with respect to the housing. The housing preferably is a rigid structure constructed of material capable of protecting the drive over its lifetime.

It has been observed that replacing the gas contents or interior environment of a disk drive with an inert gas, such as, for example but not limited to helium, improves drive performance by decreasing the power necessary to operate the drive. In addition, replacing the interior environment of the disk drive with an inert gas decreases turbulence and vibration. However, current methods of disk drive housing manufacture do not provide for a gas-tight or impermeable housing. Thus, in the ever-continuing requirement for improved disk drives, it is of interest in the art to develop improved disk drives, gas-tight disk drive housings, and methods of manufacture therefor.

SUMMARY OF THE INVENTION

The present invention provides a method for a laser-based sealing of disk drives, and for gas-tight disk drives. Preferably, the disk drive housing is made of aluminum or steel, and is constructed such that the disk drive components can be inserted therein, and then the disk drive housing can be sealed using a laser. Gas can be pumped into the disk drive housing after assembly by way of a valve or port; alternatively, assembly of the disk drive can take place in a gas environment, such as a helium environment.

Thus, the present invention provides a method of sealing a disk drive housing comprising providing a base component of the disk drive housing; providing a cover component of the disk drive housing; and laser-welding the base component to the cover component to seal the disk drive housing. In addition the method of the present invention may further include providing a spindle assembly inside the disk drive housing wherein the spindle assembly includes a data storage disk and an axially-extending spindle shaft for supporting the data storage disk; providing a data transducing head inside the disk drive housing proximate to the data storage disk; providing an electrical circuit means for controlling the rotation of the data storage disk; and providing an actuator means inside the disk drive housing for positioning the transducing head relative to the data storage disk.

BRIEF DESCRIPTION OF THE DRAWINGS

The teaching of the present invention can readily be understood by considering the following detailed description in conjunction with the accompanying drawings.

DETAILED DESCRIPTION OF THE INVENTION

Figure 1:
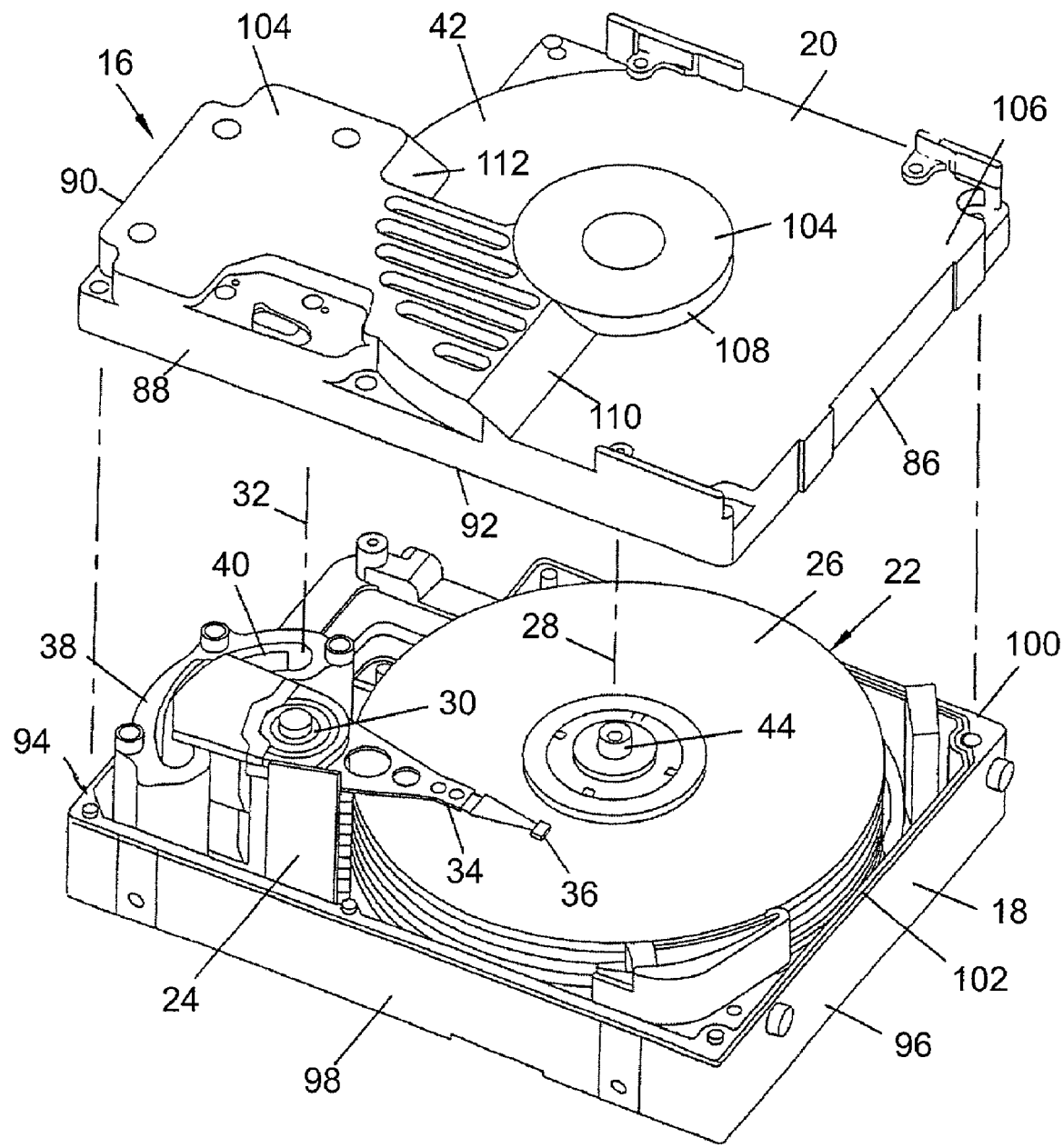
FIG. 1 is perspective partial view of a disk drive with the top cover of the drive housing removed to illustrate certain features.

Turning now to the drawings, there is shown in FIG. 1 part of a magnetic disk drive 16. The disk drive has a rigid outer housing including a base 18 and a cover 20. Cover 20 is removed from the base to reveal a disk pack or spindle assembly 22 and a rotary actuator 24, both of which are mounted moveably with respect to the housing. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base about a vertical actuator axis 32. Several transducer support arms, including a top support arm 34, are fixed to rotate with the rotator shaft. Each arm carries a magnetic data transducing head, for example, a transducing head 36 on a support arm 34. The rotary actuator pivots to move the transducing head along arcuate paths generally radially of the disks. Selective actuator pivoting, in combination with controlled rotation of the disks, allows reading and recording of data at any desired location at any one of the disk recording surfaces. Actuator 24 is pivoted by selective application of electrical current to a voice coil 38 supported for arcuate movement within a magnetic field created by a permanent magnet arrangement 40 including several magnets and a poll piece (not illustrated in further detail).

The rotary actuator and spindle assembly are supported between two opposed housing walls, including a top wall 42 of a cover 20, and a bottom wall of a base 18. The spindle shaft and actuator shaft may be stationary, meaning that they are integral with the housing, with the disks and support arms being mounted to rotate relative to their respective shafts.

Cover 20 includes a vertical continuous sidewall structure including a rearward wall 86, sidewall 88, and a forward wall 90. Here, the upper sidewall structure includes a flat, horizontal continuous bottom edge 92, though some embodiments may include a flange or other mated fitting so as to fit into a top edge 100 of base 18 to facilitate a tight fit and/or laser-welding. Base housing 18 includes an upright wall structure including a forward wall 94, a rearward wall 96, and two opposed sidewalls, one of which is shown at 98. These walls combine to form a continuous, horizontal top edge 100. The present embodiment also shows an elastomeric seal 102 mounted to top edge 100 though seal 102 is optional. When cover 20 is assembled onto base 18, confronting bottom edge 92 of cover 20 and top edge 100 of base 18 are brought into sealing engagement to close the housing about the spindle assembly and rotary actuator.

The upper and lower sidewalls are relatively thick to lend rigidity to the housing. Top wall 42 may be formed with a horizontal full height region 104, a horizontal recessed region 106, and interconnected by several non-horizontal regions as indicated at 108, 110 and 112. The full height region accommodates the rotary actuator and spindle assembly. The non-horizontal regions provide additional stiffness to a top wall 42, which strengthens the wall and enables a reduced thickness wall construction.

Figure 2:
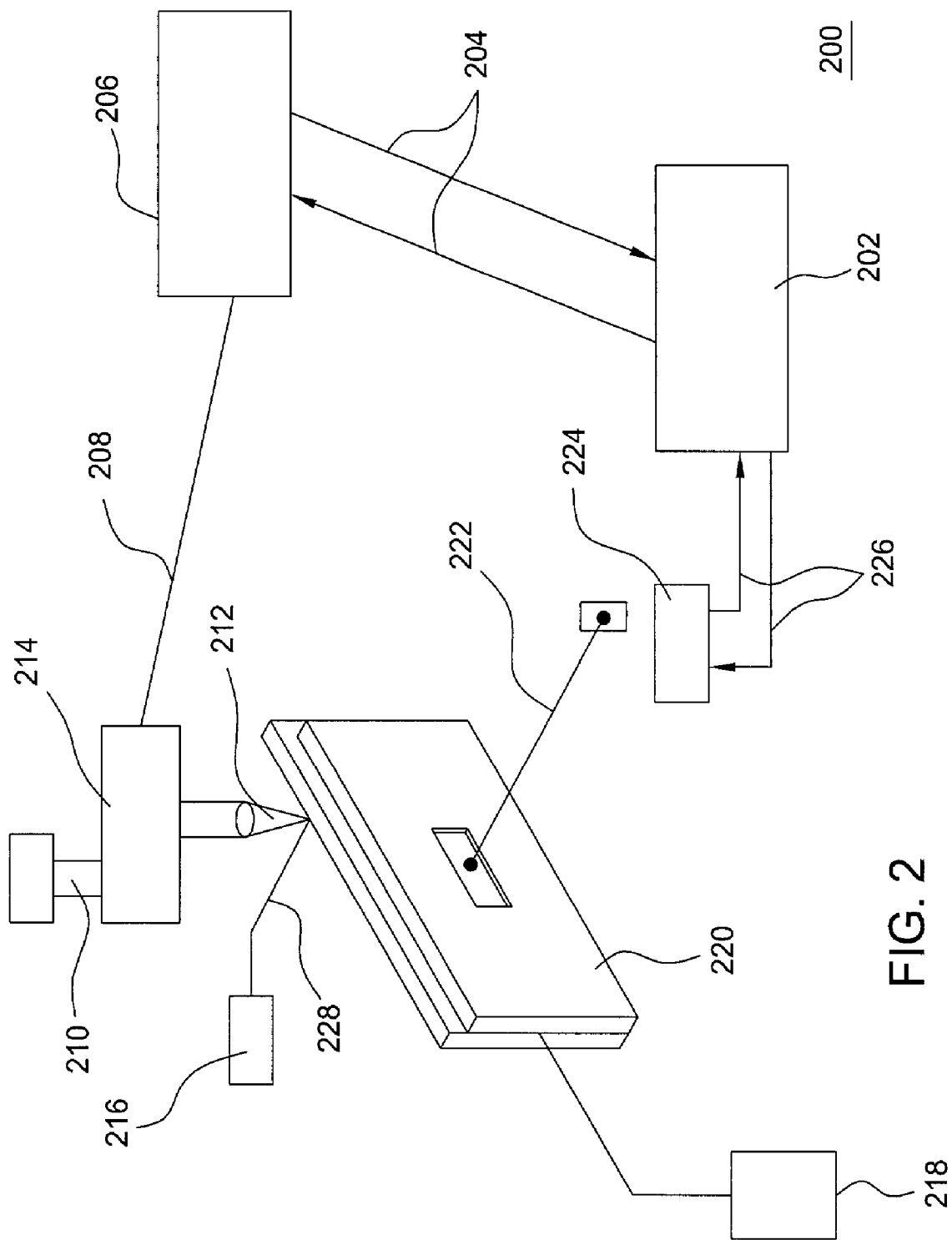
FIG. 2 illustrates on embodiment of a laser-based sealing apparatus for sealing a disk drive.

FIG. 2 shows a simplified laser sealing device 200. The device has a control system 202, a laser 206, and communication 204 between control system 202 and laser 206. Laser 206 is connected to laser focus head 210 by a fiber or direct coupling 208 and a means 214 to supply a laser beam 212 from laser 206 to laser focus head 210. Laser 206 may be any type of laser suitable for the purpose of sealing a disk drive housing, including but not limited to an Ng:YAG (neodymium doped yttrium/aluminum/garnet crystal) laser. Laser beam 212, is focused on drive housing 220 in order to laser seal the top of drive housing 220 to the bottom of drive housing 220. FIG. 2 shows the cover components meeting and being welded at a midpoint in the sidewall of the housing; however, the housing could be a flat base with a cover with sidewalls, in which case the weld would be positioned at the lower edge of the sidewall. Alternatively, the housing could be a flat cover with a base with sidewalls, in which case the weld would be positioned at the upper edge of the sidewall. Other configurations known in the art may be used as well. In addition, a flux or filler material supply 216 provides flux via flux line 228 for the laser-welding of drive housing 220. Additionally, there is an inert gas supply 218 which supplies gas to fill drive housing 220.

Alternatively, certain components of laser sealing device 200 (such as, for example, laser focus head 210, flux line 228, drive housing 220 and gripper 222) may be operated in a gas environment, such as an inert gas environment, making inert gas supply 218 unnecessary. Drive housing 220 is held in place and manipulated by way of a gripper 222 that attaches the drive housing 220 to a robotic manipulator 224. The robotic manipulator 224 and gripper 222 assembly move the drive housing 220 such that the laser beam 212 laser welds the drive housing 220. In addition, there is communication 226 provided between control system 202 and robotic manipulator 224.

Figure 3:
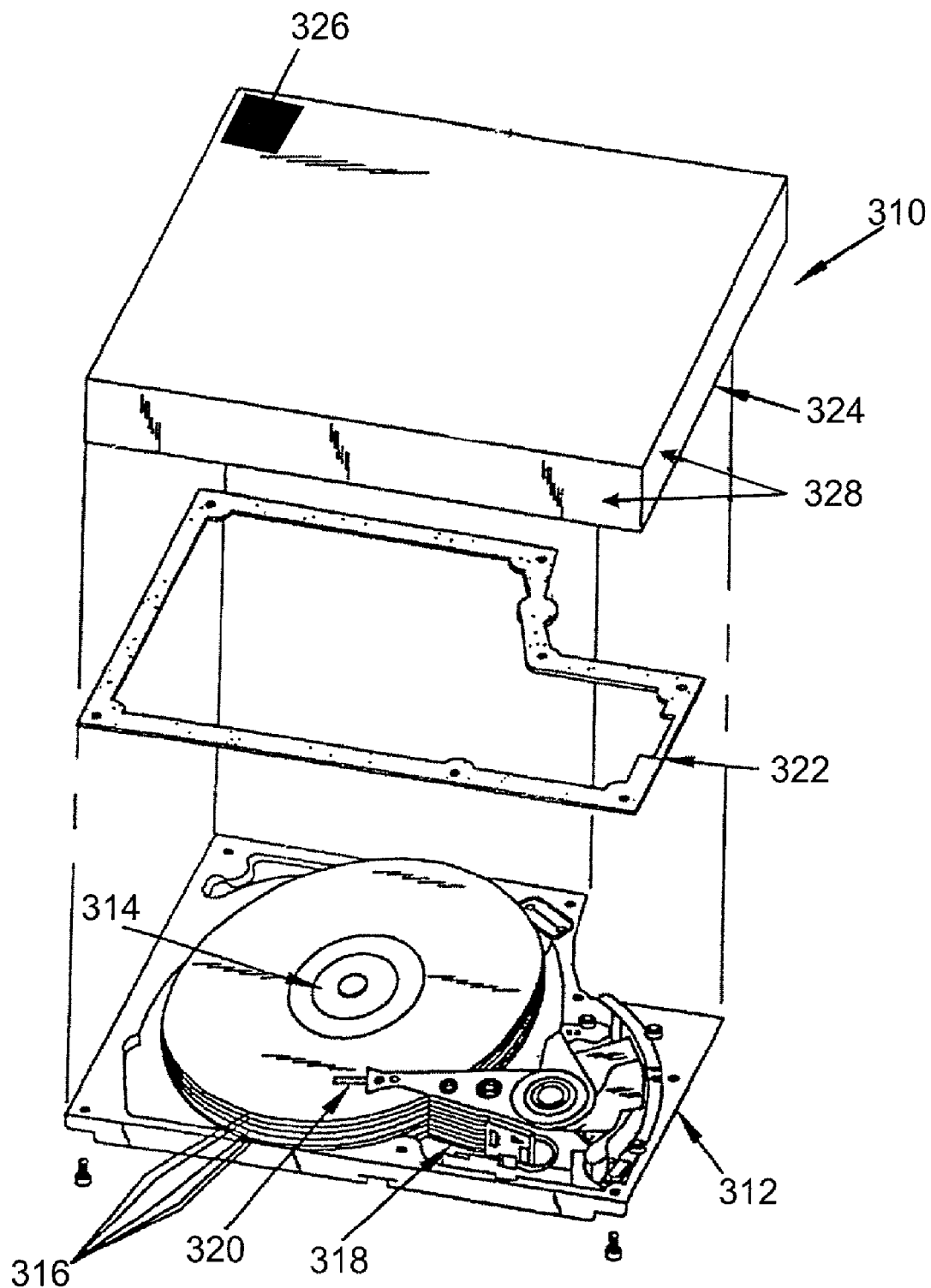
FIG. 3 is an exploded perspective view of a disk drive storage system.

FIG. 3 is an exploded perspective view of a magnetic disk drive storage system. In this particular embodiment, storage system 310 includes a housing base 312 having a spindle assembly 314 which rotatably carries storage disks 316. An armature assembly 318 moves transducers 320 across the surface of the disks 316. The environment of disks 316 is sealed by seal 322 (optional), base 312, and cover 324. In this embodiment, base 312 does not have an upwardly-disposed sidewall structure as shown in FIG. 1. Instead, base 312 is essentially flat, and the sidewall structures 328 of cover 324 (two of which are shown) provide the sidewall structure for the housing.

According to the present invention, once housing base 312 is sealed by seal 322 to cover 324, base 312 will be laser-welded to cover 324 using a laser sealing device like the one shown in FIG. 2, for example. Also, shown in this embodiment is a means 326 for communicating with the interior of storage system 310 once housing base 312 has been laser-welded to housing cover 324. Means 326 can be a valve or a port which allows storage system 310 to be filled with gas once housing base 312 has been welded to housing cover 324 but is gas impermeable once the filing is complete. Such a valve or port may be any known in the art that permits gas to be injected into an enclosure but prevents gas from escaping thereafter, including, for example, a Schraeder-type valve.

Figure 4:
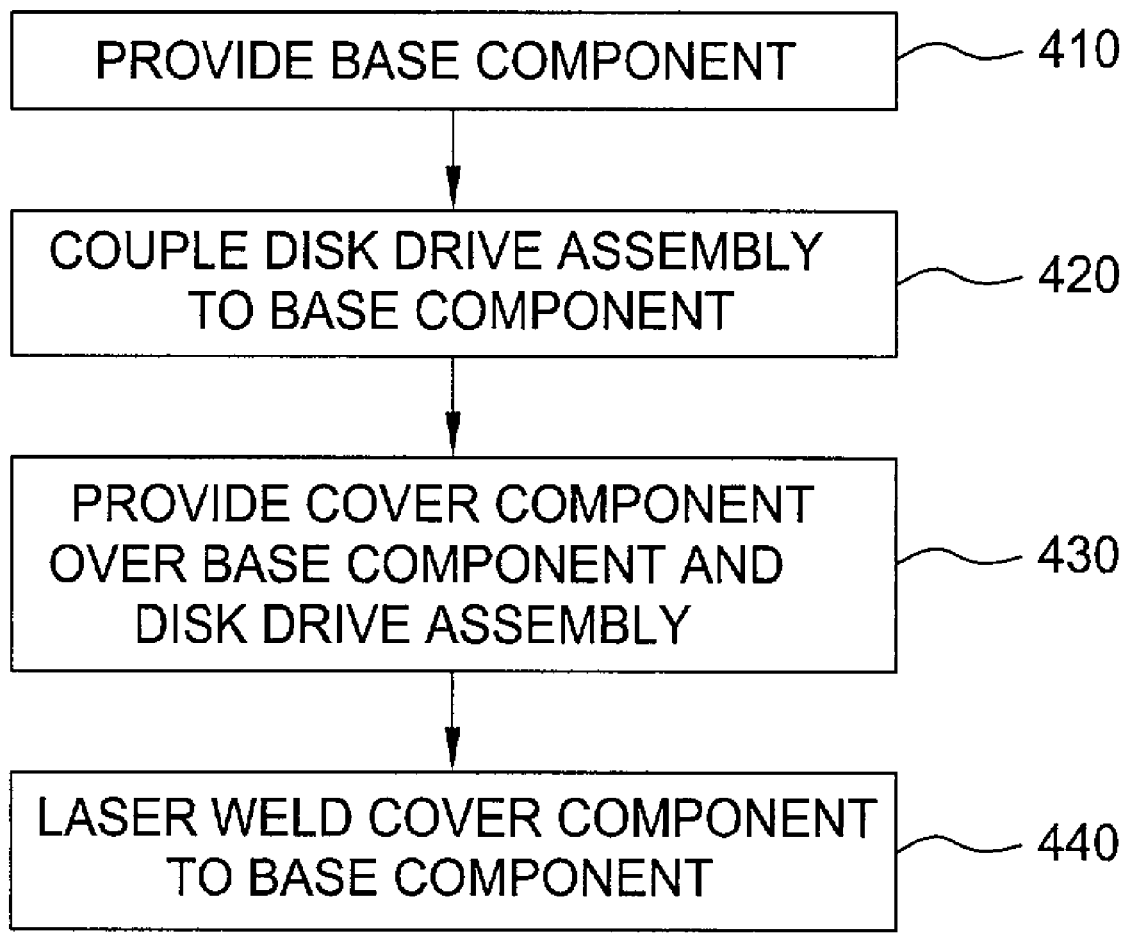
FIG. 4 is a simple schematic of one embodiment of the method of the present invention.

FIG. 4 shows a simple schematic of one embodiment of a method 400 of the present invention. In a first step, a base component is provided 410. Next, a disk drive assembly is coupled to the base component 420. The disk drive assembly may include a spindle assembly, including at least one data storage disk and a spindle shaft for supporting the data storage disk, a data transducing head positioned proximate to the disk for writing bit-encoded data onto a recording surface of the disk, an electrical circuit means for controlling the rotation of the disk, and an actuator for positioning the transducing head relative to the disk. Next, in step 430, a cover component of the housing is provided over the base component and the disk drive assembly.

Finally, in step 440, the base component is laser-welded to the cover component. Both the base component and the cover component are manufactured such that, once laser-welded together, they provide an airtight disk drive housing. Either or both of the base component or cover component may contain a valve or port which allows for communication between the outside of the disk drive housing and the inside of the disk drive housing once laser-welding has taken place. This valve or port allows for the injection of gas into the housing once the housing has been sealed. Alternatively, the disk drive assembly can be assembled in an inert gas environment. The pressure of the inert gas in the housing is at or about atmospheric pressure or somewhat higher.

Various modifications to the methodologies and housing assemblies disclosed herein may occur to those skilled in the art without departing from the spirit and scope of the invention as defined by the appended claims.

The invention claimed is:

1. A method of sealing a disk drive housing comprising:
   providing a base component of the disk drive housing;
   providing a cover component of the disk drive housing;
   laser sealing the base component to the cover component to form an air-tight seal for the disk drive housing using a laser sealing device comprising a laser and a control system; and
   supplying an inert gas to the disk drive.

2. The method of claim 1, wherein the base and cover components are made of aluminum.

3. The method of claim 1 wherein the base and cover components are made of steel.

4. The method of claim 1 further comprising the steps of:

providing a spindle assembly inside the disk drive housing wherein the spindle assembly includes a data storage disk and an axially-extending spindle shaft for supporting the data storage disk;

providing a data transducing head inside the disk drive housing proximate to the data storage disk;

providing an electrical circuit means for controlling the rotation of the data storage disk; and providing an actuator means inside the disk drive housing for positioning the transducing head relative to the data storage disk.

5. The method of claim 1 wherein the step of supplying an inert gas to the disk drive comprises operating components of a laser-welding device in an inert gas environment during the sealing process.

6. The method of claim 1 wherein the inert gas is helium.

7. A disk drive housing produced by the method of claim 1.

8. The disk drive housing of claim 7 further comprising a means for adding gas to the housing once the housing has been sealed.

9. The disk drive of claim 8 wherein the base component and cover component are made of steel.

10. The method of claim 1, wherein the inert gas is supplied via a valve or port in the disk drive housing.

11. A disk drive comprising:
a disk drive housing incorporating a base component and cover component defining an enclosed space, wherein the base component and cover component are laser sealed to one another by a laser sealing device to form a continuous air-tight laser weld on the disk drive housing;
a disk drive assembly disposed within the enclosed space; and
an inert gas contained within the enclosed space.

12. The disk drive of claim 11 further comprising means for adding gas to the housing once the housing has been sealed.

13. The disk drive of claim 11 wherein the inert gas is supplied via a valve or port in the disk drive housing.

14. The disk drive of claim 11 wherein the inert gas is helium.

15. The disk drive of claim 11 wherein the base component and cover component are made of aluminum.

16. A method of sealing a disk drive housing comprising:
providing an inert gas environment;
providing a base component of the disk drive housing;
providing a cover component of the disk drive housing; and
laser sealing the base component to the cover component in the inert gas environment to form an air-tight seal for the disk drive housing using a laser sealing device comprising a laser and a control system.

17. The method of claim 16 wherein the base component and cover component are made of steel.

18. The method of claim 16 wherein the inert gas is helium.

19. The method of claim 16 further comprising the steps of:
providing a spindle assembly inside the disk drive housing wherein the spindle assembly includes a data storage disk and an axially-extending spindle shaft for supporting the data storage disk;
providing a data transducing head inside the disk drive housing proximate to the data storage disk;
providing an electrical circuit means for controlling the rotation of the data storage disk; and
providing an actuator means inside the disk drive housing for positioning the transducing head relative to the data storage disk.

20. The method of claim 16 wherein the base component and cover component are made of aluminum.

\* \* \* \* \*